M. MEUSHAW.
MOTION PICTURE CAMERA.
APPLICATION FILED MAY 21, 1915.

1,192,666.

Patented July 25, 1916.
6 SHEETS—SHEET 1.

M. MEUSHAW.
MOTION PICTURE CAMERA.
APPLICATION FILED MAY 21, 1915.

1,192,666.

Patented July 25, 1916.
6 SHEETS—SHEET 4.

Witness
Roland J. Booth

Inventor
Morrill Meushaw
By
Knight Bros
Attorneys.

UNITED STATES PATENT OFFICE.

MERRILL MEUSHAW, OF BALTIMORE, MARYLAND.

MOTION-PICTURE CAMERA.

1,192,666.  Specification of Letters Patent.  Patented July 25, 1916.

Application filed May 21, 1915. Serial No. 29,692.

*To all whom it may concern:*

Be it known that I, MERRILL MEUSHAW, a citizen of the United States, residing at Baltimore, State of Maryland, have invented certain new and useful Improvements in Motion-Picture Cameras, of which the following is a specification.

My invention relates to that class of motion picture cameras in which the lens and film move together.

One object of the present invention is to reduce to a negligible amount the inaccuracy due to vibration and error in the synchronism of the lens and film motion which is unavoidable in mechanisms which move with the necessary speed and facility.

This object is attained in the present invention by the use of a rotary shutter provided with a radial opening of variable extent, but always smaller than the area of the required negative, and moving across the film at such close proximity thereto, that the film area constituting an individual negative is exposed by successive portions of the film, each portion being of the required area, thus reducing the area in question to such an extent, and in the same proportion as the radial shutter opening is a fraction of the area of the required individual negative.

In cameras of known construction, it is evident that even a small amount of blurring upon a negative will spoil it for enlargements, because the mechanism of such cameras, even of the best make, must have some slight lost motion, so that the moving together of the film and lens in that case, will be of no benefit.

In using an ordinary shutter opening adjacent to the lens and exposing the whole negative at once as is usual in known cameras, the film motion would cause a band at the top of each negative and a similar band at the bottom, having less exposure than the remainder of the negative. In the present invention this is prevented and the whole area of each negative is equally exposed as the successive strips of exposure are substantially in a vertical direction of the negative.

The present invention is so far as known, the only practical solution avoiding the enumerated disadvantages.

The "focal plane rotary shutters" which are used provide a means for taking sharp negatives at a speed of exposure considerably greater than is practicable with other kinds of shutters. It is well known in taking photographic pictures that the lens chamber is flooded by light reflected by the white film to the rear of the lens and then to the negative again, and that this light causes a blurring or fogging of the negative which is very apparent upon a long development. In the present method of exposure, when my rotary focal plane shutter is used, this shutter having only a narrow slit opening, the reflection is very slight, resulting from a fractional part of the total area of the negative as the shutter covers the remainder of the negative and the lens chamber being black and absorbent of light. As a consequence, negatives treated in my camera may be developed to their full density without the usual danger of fogging.

In the accompanying drawings the present invention has been illustrated, Fig. 6 illustrates the mounting of the lens.

The unexposed film 25 is wound upon the reel 26, mounted to revolve in a light tight box 27, provided with a narrow opening 28 through which the film is drawn to pass over a pair of sprocket wheels 29 engaging with the teeth in the corresponding openings in the film, and feeding it forward past the window 30 in partition 31 of the camera case 32. Close behind this opening is a platen 33 which is rounded at its upper and lower edges for holding the film close to the opening and to prevent light to enter the interior of the camera. After having passed the window, the film is led over another pair of sprocket wheels 34 through a narrow opening 35 in the lower box 36 containing the receiving reel 37 which is now mounted to rotate in the box.

Figures 3, 4, 5, 14:
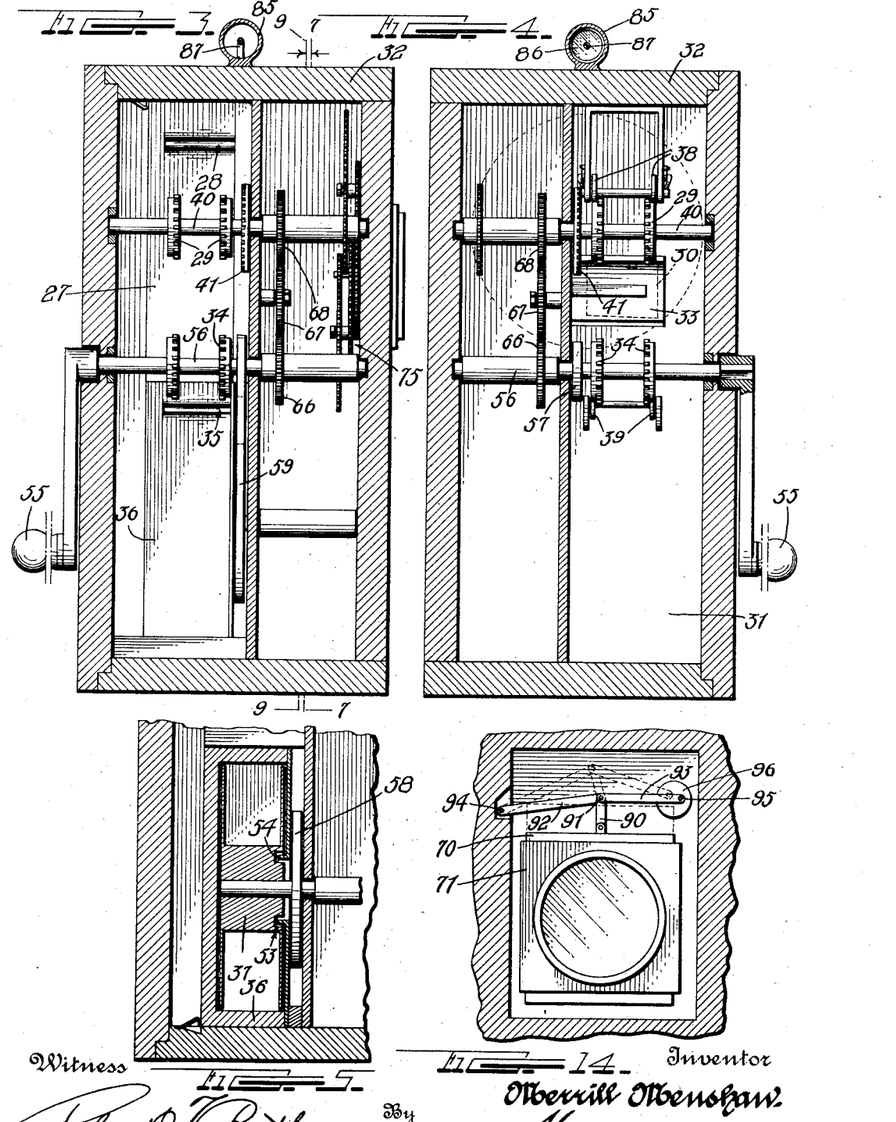
Fig. 3 is a transverse section on the line 3—3, Fig. 1, seen from the right.
Fig. 4 is a similar section on the line 4—4, Fig. 1, seen from the left.
Fig. 5 is a section of the receiving reel and adjacent parts.
Fig. 14, a modified form of lens mounting.
Figure 7:
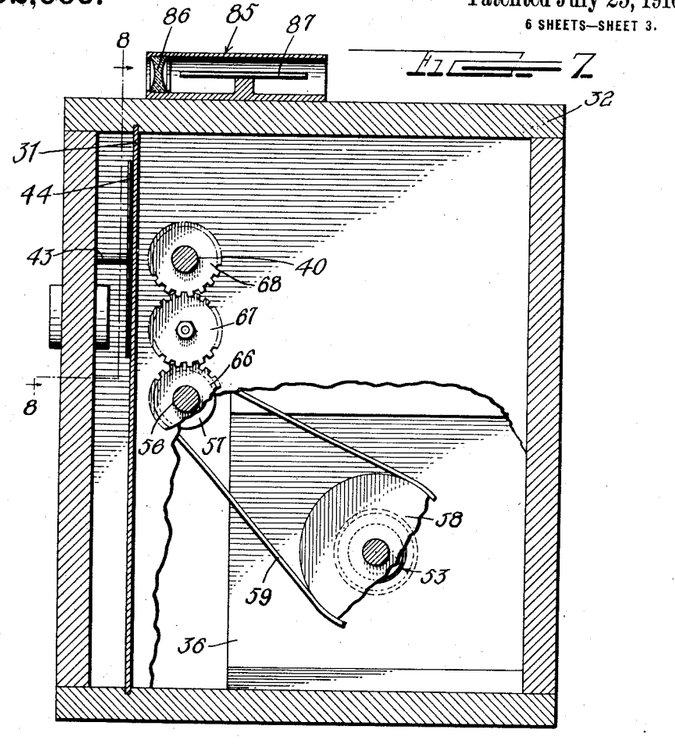
Fig. 7 is a vertical section on the line 7—7, Fig. 3, looking toward the left with a part of the partition broken away.

The upper sprocket wheel shaft 40 is positively driven by and at the same speed as the lower sprocket wheel shaft 56 in any suitable manner, as for instance, as shown in Figs. 3, 4 and 7, by a train of spur gears 66, 67 and 68, of which 66 and 68 are rigidly secured on their respective shafts 56 and 40.

Both boxes 27 and 36 are light tight. In order to hold the film close on the surface of the sprocket wheels 29 and 34, spring pressed rollers 38 and 39 are provided, one pair for each pair of sprocket wheels.

On the shaft 40 for the upper sprocket wheels 29 is rigidly mounted a gear wheel 41 meshing with a pinion 42, mounted on a shaft 43 situated at right angles to shaft 40. Close to the partition 31, and extending over the opening 30 is situated a shutter 44 which is preferably made in two semi-circular leaves, see Figs. 11 and 12, one of which 45 is rigidly secured on the shaft 43 and the other leaf 46 is pivoted near the periphery on the journal 47 to the first leaf 45. Diametrically opposite the journal 47 is a tension spring 48 connecting the two leaves and holding them together so that the edge of leaf 46 overlaps the edge of leaf 45, thus leaving no opening in the shutter when the camera is at rest, see Fig. 11. As soon, however, as the machine is started and the shutter revolved by means of shaft 40 through gearing 41 and 42, the centrifugal force will tend to throw the two leaves apart, thus forming a narrow slit 49, see Fig. 12, between the edges of the leaves on one side of the center while the other side of the center remains closed. It will thus be seen that if the camera should be run at a higher speed the width of the slit 49 will be increased.

Figure 8:
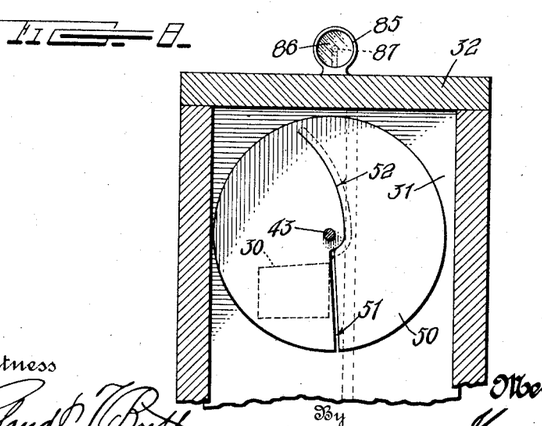
Fig. 8 is a transverse section of Fig. 7 on the line 8—8, Fig. 7.

Instead of forming the shutter in two separate leaves, it may be made in one piece as illustrated in Fig. 8, wherein the circular disk 50 has a narrow slit 51 to one side of the center, while this slit is continued on the opposite side of the center to within a short distance of the periphery of the shutter, but as the other portion 52 of the slit is beveled, its edges will overlap and not permit any light to penetrate directly on that side of the shutter. Even in this case when the shutter revolves with greater speed, the two halves of the shutter 50 tend to open.

The relative sizes of the gears 41 and 42 have been so selected that each turn of shaft 43, which is equivalent to a turn of the shutter 44, corresponds to the feeding of one complete length of a negative of the film in front of the opening 30.

Instead of having a crank shaft for feeding the film forward placed on the shaft of the receiving reel 37 as is usual in known cameras, I connect the crank handle 55 to the shaft 56 of the lower sprocket wheels 34, driving the lower reel 37 by means of pulleys 57, 58 and the belt 59, the latter preferably made of cat gut.

The lower reel core 37 is provided with an annular groove 53 engaging with an inner flange 54 for the purpose of shutting out the light.

Figure 13:
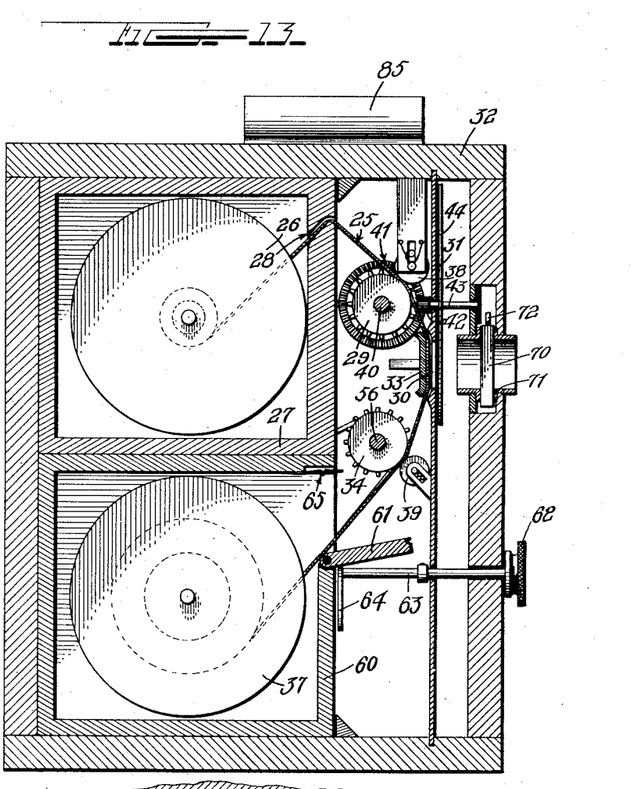
Fig. 13 is a similar view to Fig. 1 with a somewhat modified form of the box for the receiving reel.
Figure 14:
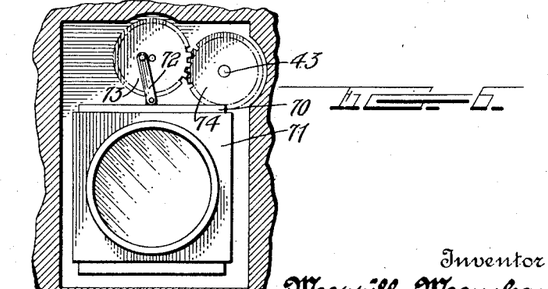

In case the camera has to be recharged in the open, and not in a dark room, I have provided a closing device for the receiving box as best seen in Fig. 13 where the receiving box 60 has a larger opening for the entry of the film. A lid 61 hinged to one side is left open during operation of the camera and can be closed by means of a knurled head 62 at the end of a spindle 63 carrying a projecting finger 64 which when turned up engages beneath the lid 61 and swings it upward after the film has been run up entirely on the receiving reel 37. A spring latch 65 will then retain the lid 61 in closed position so that the box 60 can be taken out of the camera without exposing the film to the daylight. The reel can then afterward be removed from the box when taken into a dark room.

Figure 1:
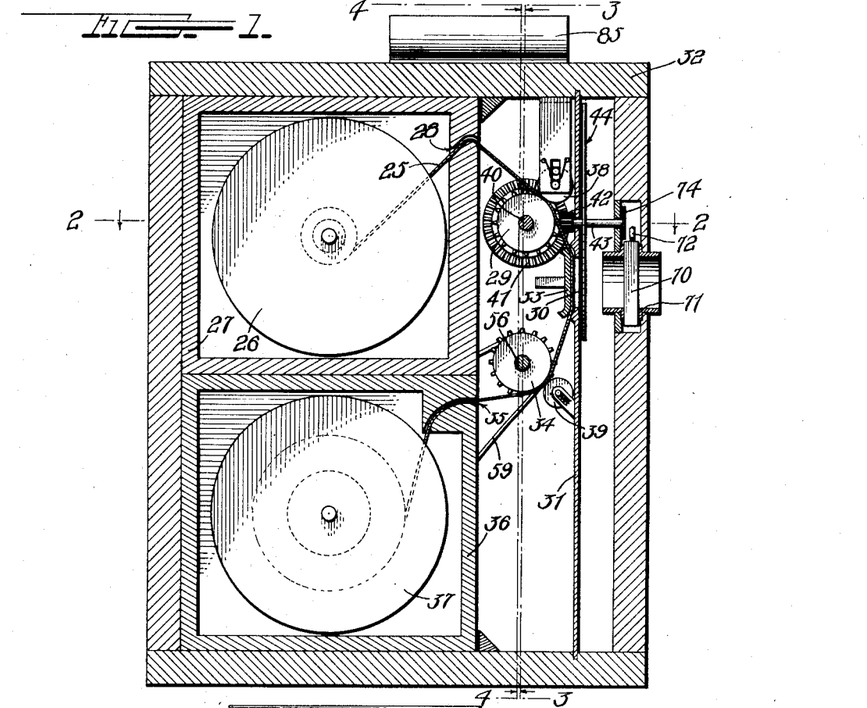
Figure 1 shows a vertical section of the camera seen from the side.
Figure 2:
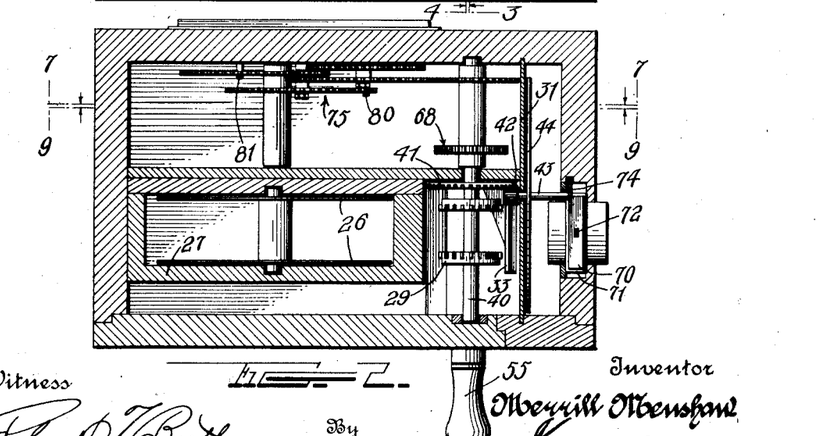
Fig. 2 is a horizontal section on the line 2—2, Fig. 1.

The lens is mounted in a sliding frame 70, see Figs. 1 and 6. This frame 70 slides in a suitable guide 71 having cylindrical flanges for collecting the light rays for the lens and the frame is suspended on a link 72 connected with a spur gear 73 which meshes with another spur gear 74 rigidly mounted on the shaft 43 of the shutter 44. In consequence of this arrangement, the lens will focus on the center of an exposed part of the film through opening 30, simultaneously with the passing of the slit of the shutter in front of the opening.

Figure 9:
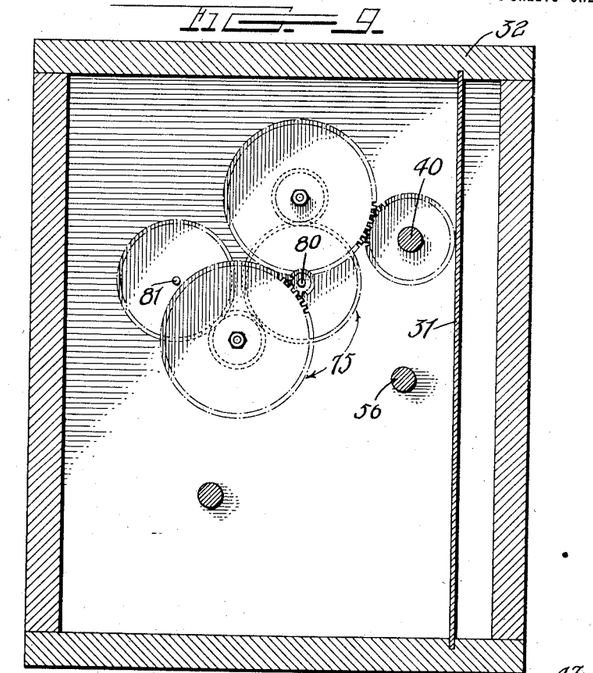
Fig. 9 is a vertical section on the line 9—9, Fig. 3, looking to the right.
Figures 10, 11, 12:
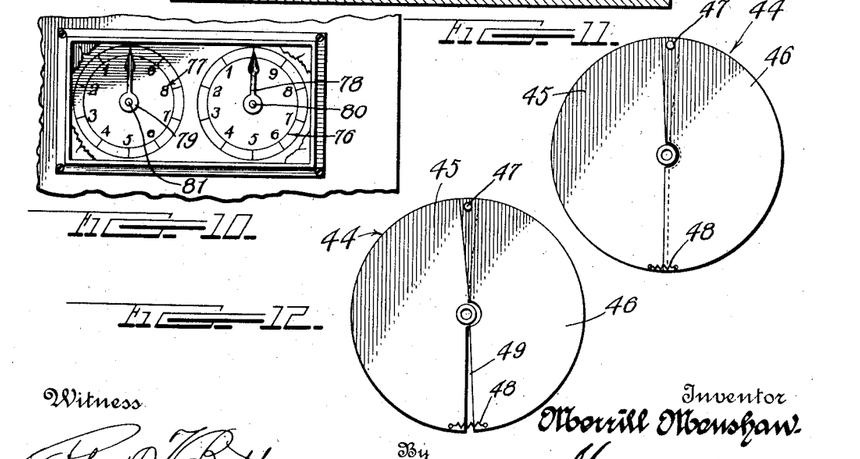
Fig. 10 is a portion of the exterior of the camera showing the dials for registering the number of exposures.
Fig. 11 is an elevation of the shutter at rest.
Fig. 12, a similar view to Fig. 11 with the shutter in operation.

In Figs. 9 and 10 is shown the clockwork for indicating the number of exposures made, and this clockwork comprises the usual train of gears 75 which is operated from shaft 40 of the upper pair of sprocket wheels 59 so that the number of exposures can be read off the two dials 76 and 77 by means of the revolving hands 78, 79 mounted on their respective spindles 80, 81.

On top of the camera is illustrated a view finder, see Figs. 1, 3, 4, 7, 8, and 13. This view finder consists of a tube 85 at one end of which is mounted a bi-concave lens 86 and an axially situated rod 87. The focal axis of this view finder is placed parallel with the focal axis of the camera lens.

The camera is used in the following manner: The film being on the reel 26 is placed in the light tight box 27 whereupon the free end of the film is passed out through the gate 28. The box 27 is then placed in position as shown in Fig. 1, whereupon the film is drawn over the sprocket wheels 29 and beneath the rollers 28. It is thereupon taken past the window 30 in front of the platen 33 and led between the sprockets 34 and rollers 39 and ultimately through the gate 35 and fastened on the lower or receiving reel 37 in the lower box 36. With the two boxes 27, 36 in position the camera is closed by means of a light tight cover. The crank handle is thereupon placed in position on the shaft 56 and the camera is now charged, ready for use.

If the above operation has been done in a dark room, the camera is ready to take pictures. If the unwinding of the reel 26, however, has been done in the open, all the film used in passing from the upper to the lower box has been exposed to the light and the crank handle 55 must be turned sufficiently to wind up the exposed portion of the film on the receiving reel 37, until an unexposed portion of the film has arrived in front of the window 30.

The camera is now set in the proper position for taking pictures and the handle is turned at any suitable speed. In turning the handle 55 the revolution of shaft 56 is communicated to the receiving reel 57 by means of the belt 59, and also to the sprocket wheels 29 by means of the gears 66, 67, 68, so that the shutter 44, as well as the lens frame will start to move. The camera will now make one exposure for each length of film exposed in the window 30 when the lens and the slit in the shutter will simultaneously register in front of the window. Directly the slit in the shutter 34 has passed the window the axis of the lens is also moved out of alinement with the center of the window. This procedure is repeated during continued turning of the handle 55 until the whole length of the film has been gradually exposed before the window 30. The boxes 37 and 36 are now ready to be removed and the camera ready to be recharged.

If instead of the lower box 36 for the receiving reel, one like the box 60 shown in Fig. 13, has been used, the lid 61 is to be closed as soon as the end of the film has been entirely wound up on the reel 37. This is done by turning the knurled head 62 half a turn, thereby swinging the lid 61 upward until it is latched by the spring 65 when the boxes may be removed in the open without first taking the camera into a dark room.

In Fig. 14 is shown a modified form of lens mounting where the lens frame 70 is slidable perpendicularly in frame 71 as before. The frame 70 is suspended on a connecting rod 90 fulcrumed at 91 to the ends of two links 92, 93. The former one of these links 92 has its other end journaled at 94 and the link 93 is eccentrically journaled at 95 on a disk 96 which is rigidly secured on the shutter of shaft 43. It will be obvious that when the shaft 43 revolves, the lens frame 70 will be reciprocated up and down as indicated in this figure.

Figure 15:
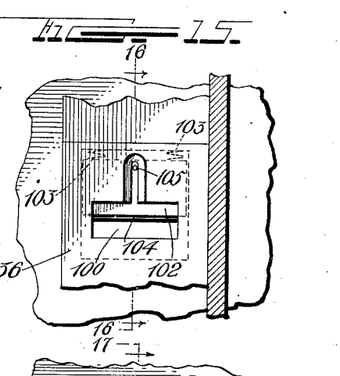
Fig. 15 is a front view of a modified form of film passage in the receiving box.
Figure 16:
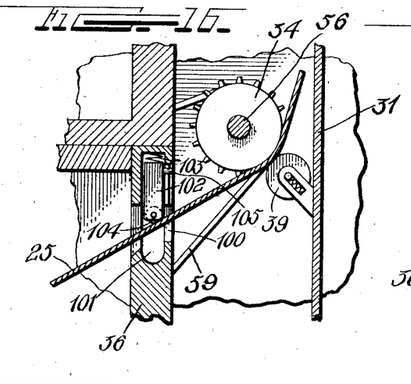
Fig. 16, a vertical section on line 16—16 of Fig. 15.

Instead of making the curved film passage 35 for the receiving box 36 as shown in Fig. 1, it might at times be preferable to provide a window 100 as shown in Figs. 15 and 16 which widens inward to accommodate the different angles of the entering film 25. Intersecting this passage is a pocket or recess 101 in which a plunger gate 102 is made to slide up and down. This gate may be actuated by gravity alone or be assisted by a couple of weak springs so that it is made to rest lightly on the film 25 with its roller 104 provided at the lower end. When there is no film passing, the gate 102 slips down to the bottom of the pocket 101, entirely shutting out the light. To facilitate the raising of the gate when the end of a new film is to be put in, a sidewise projecting stud 105 has been provided.

Figure 17:
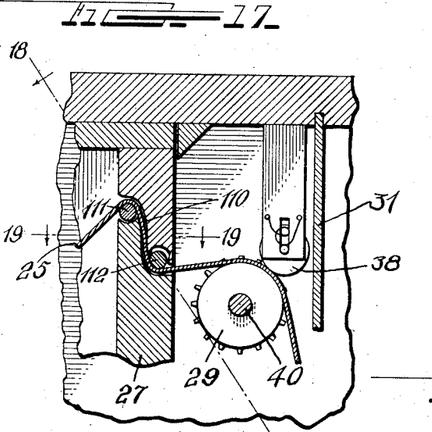
Fig. 17 is a vertical section on line 17—17 of Fig. 18 showing a modified form of film passage in the delivery box.
Figure 18:
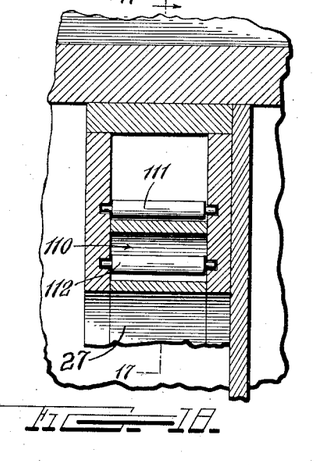
Fig. 18, a diagonal section on line 18—18 of Fig. 17.
Figure 19:
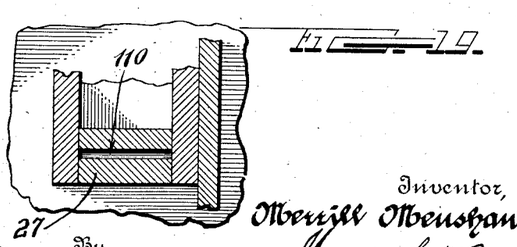
Fig. 19, a cross section on line 19—19 of Fig. 17.

In Figs. 17 to 19 is shown an S-shaped passage 110 instead of the single curved one 28 for the delivery box 27, Fig. 1. At both ends of this passage rollers 111 and 112 are provided for conducting the film 25 from the box. It is obvious that by means of this arrangement no light can penetrate into the interior of the box.

It will be readily understood that the shape of the negative produced on a traveling film 25 depends not only on the window but also on the revolving slit 49 or 51. With the window 30 and the shutter 50 situated in the relative positions indicated in Fig. 8, the slit 51 makes a sweep from right to left of the window, thus making a gradual exposure from right to left of the film. Considering now a point on the film under the right hand top corner of the window 30 at the time it is being exposed to light by the passing slit 51, it will be evident that a little time will pass before another point at the same level and to the left of the window can be similarly exposed. In other words, a third point, above the second one, will be exposed in the left hand top corner by the time the slit reaches that place and under the supposition that the top edge of the window is level and the film travels downward. The same is also true with regard to the bottom edge of the window.

Figure 20:
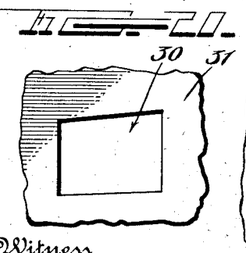
Fig. 20 is an elevation of the camera window in larger scale.

It will thus be seen that a rectangular window, will not produce a rectangular negative on the film if the film and the shutter slit travel at approximately right angles to each other. In order to obtain a rectangular negative under these conditions, it will then be necessary to incline the top and bottom edges of the window relative to its perpendicular side edges, as best seen in Fig. 20, but also indicated in Figs. 4 and 8. It makes no difference whether the film runs upward instead of downward, the edges have to be inclined in any case. Should the film run sidewise and the shutter slit travel in an approximately vertical direction, I make the side edges inclined and the top and bottom ones horizontal.

I claim:—

1. In a photographic camera for ribbon films, provided with a reciprocating lens and a window, means for continuously feeding the film past the window, a movable shutter provided with a normally closed narrow slit, said shutter and said lens being positively driven by said means in such a manner that the slit passes the window once for each complete exposure of a length of the film before the window corresponding to the length of a negative, the slit being held open by such movement.

2. In a photographic camera for ribbon films, provided with a reciprocating lens and a window, means for continuously feeding the film past the window, a movable shutter provided with a normally closed narrow slit, said shutter and said lens being positively driven by said means in such a manner that the slit passes the window in transverse direction to the direction of the movement of the film once for each complete exposure, of a length of the film before the window, corresponding to the length of a negative, the slit being held open by such movement.

3. In a photographic camera for ribbon films, provided with a reciprocating lens and a window, means for continuously feeding the film past the window, a circular revoluble shutter provided with a normally closed narrow radial slit, said shutter and said lens being positively driven by said means in such a manner that the slit passes the window once for each complete exposure of a length of the film before the window corresponding to the length of a negative, the slit being held open by such movement.

4. In a photographic camera for ribbon films, provided with a reciprocating lens and a window, means for continuously feeding the film past the window, a revoluble shutter comprising two semi-circular leaves connected near the periphery, whereby the centrifugal force will cause relative movement between the leaves to form a narrow slit between their radial edges, said shutter and said lens being positively driven by said means in such a manner that the slit passes the window once for each complete exposure of a length of the film before the window corresponding to the length of a negative.

5. In a photographic camera for ribbon films, provided with a reciprocating lens and a window, means for continuously feeding the film past the window, a revoluble shutter comprising two semi-circular leaves connected near the periphery, whereby the centrifugal force will cause relative movement between the leaves to form a narrow slit between their radial edges, the width of said slit varying with the speed of the moving film, said shutter and said lens being positively driven by said means in such a manner that the slit passes the window once for each complete exposure, of a length of the film before the window corresponding to the length of a negative.

6. In a photographic camera for ribbon films provided with a reciprocating lens and a window, means for continuously feeding the film past the window, a movable shutter provided with a normally closed narrow slit of considerably smaller area than the area of said window, said means adapted to move the lens in the shutter and to open the slit.

7. In a photographic camera for ribbon films, provided with a reciprocating lens and a window, means for continuously feeding the films past the window, a revoluble shutter comprising two semi-circular leaves having journal connection at one end and spring connection at the opposite end, whereby the diametrical edge of one leaf overlaps the corresponding edge of the other leaf with the camera at rest, said edges moving apart to form a narrow radial slit actuated by the centrifugal force when the camera is in action, said shutter and said lens being positively driven by said means in such a manner that the slit passes the window once for each complete exposure of a length of the film before the window corresponding to the length of a negative.

8. In a photographic camera for ribbon films provided with a reciprocating lens and a window, a revoluble shutter comprising two semi-circular leaves having journal connection at one end adjacent the periphery and spring connection at the opposite end, whereby the diametrical edge of one leaf slightly overlaps the corresponding edge of the other leaf, with the shutter at rest, means for continuously feeding the film past the window and simultaneously revolving said shutter, said edges of the leaves moving apart to form a narrow slit actuated by the centrifugal force when the shutter revolves.

9. In a photographic camera for ribbon films, provided with a window, means for continuously feeding the film past the window, a revoluble shutter provided with a normally closed narrow slit, a lens frame mounted to slide in front of said window in a direction parallel to that of the movement of the film ribbon, said feeding means comprising sprocket wheels engaging with the film, a gear wheel mounted on a crank handle for rotating said sprocket wheels; a gear wheel coaxially mounted with and positively connected to said sprocket wheels, a spindle for said shutter, a pinion meshing with said gear wheel on said spindle and positive connection between said spindle and lens frame for reciprocating the same; whereby said lens frame and said film ribbon are made to move together in the same direction and at the same speed synchronously with the opening and passing of said slit across the window.

10. In a photographic camera for ribbon films, provided with a window, means for continuously feeding the film past the window, a lens frame mounted to slide in front of said window parallel to the direction of the movement of the film ribbon, a movable shutter provided with a normally closed narrow slit, said lens frame and said shutter being positively driven and the slit opened by said feeding means in such a manner that said lens frame and said film ribbon move together in the same direction and at the same speed, synchronously with the passing of said slit across the window.

11. In a photographic camera for ribbon films, provided with a window, means for continuously feeding the film past the window, a revoluble shutter provided with a normally closed narrow slit, a lens frame mounted to slide in front of said window in a direction parallel to that of the movement of the film ribbon, said feeding means comprising sprocket wheels engaging with the film, a gear wheel mounted on a crank handle for rotating said sprocket wheels; a gear wheel coaxially mounted with and positively connected to said sprocket wheels, a spindle for said shutter, a pinion meshing with said gear wheel on said spindle and positive connection between said spindle and lens frame for reciprocating the same; said positive connection comprising a spur gear on said spindle, a pinion meshing with said spur gear, a link from which said frame is suspended, said link being eccentrically journaled on said pinion; whereby said lens frame and said film ribbon are made to move together in the same direction and at the same speed synchronously with the opening and passing of said slide across the window so that the exposure of the film through the shutter shall take place relatively to said lens at uniform intervals while said film ribbon is moved through a certain predetermined space for each exposure.

12. A photographic camera having a reciprocating lens for producing a rectangular negative on a ribbon film, provided with a window having four sides two of which are parallel to the direction of travel of said film, and the other two sides are inclined to said direction, a movable shutter having a normally closed narrow slit for exposure, and means positively connected with said lens for moving said shutter so that the slit opens and traverses the window in a direction intersecting that of travel of the film.

13. A photographic camera having a reciprocating lens for producing a rectangular negative on a perpendicularly traveling film, provided with a window having four sides, two of which are vertical, and the other two sides are inclined, a movable shutter having a normally closed narrow slit for exposure, and means positively connected with said lens for moving said shutter so that the slit opens and traverses the window in an approximately horizontal direction.

14. A photographic camera having a reciprocating lens for producing a rectangular negative on a downwardly traveling film, provided with a window having four sides, two of which are vertical, and the other two sides are inclined, a movable shutter having a normally closed narrow slit for exposure, and means positively connected with said lens for moving said shutter so that the slit opens and traverses the window in an approximately horizontal direction.

The foregoing specification signed at Baltimore, Maryland, this fifteenth day of May, 1915.

MERRILL MEUSHAW.